(12) United States Patent
Maekawa et al.

(10) Patent No.: US 10,724,368 B2
(45) Date of Patent: Jul. 28, 2020

(54) DOWNHOLE APPARATUS AND TECHNIQUE TO MEASURE FLUID RESISTIVITY

(71) Applicant: Schlumberger Technology Corporation, Sugar Land, TX (US)

(72) Inventors: Yuichi Maekawa, Kanagawa-ken (JP); Zhixiang Chen, Tokyo (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 223 days.

(21) Appl. No.: 15/828,460

(22) Filed: Dec. 1, 2017

(65) Prior Publication Data

US 2018/0171789 A1 Jun. 21, 2018

Related U.S. Application Data

(60) Provisional application No. 62/434,586, filed on Dec. 15, 2016.

(51) Int. Cl.
| | |
|---|---|
| *E21B 49/10* | (2006.01) |
| *G01V 3/20* | (2006.01) |
| *G01V 3/24* | (2006.01) |
| *G01V 3/30* | (2006.01) |
| *E21B 49/08* | (2006.01) |

(52) U.S. Cl.
CPC ............ *E21B 49/10* (2013.01); *E21B 49/088* (2013.01); *G01V 3/20* (2013.01); *G01V 3/24* (2013.01); *G01V 3/30* (2013.01)

(58) Field of Classification Search
CPC ......... E21B 49/10; E21B 49/088; G01V 3/20; G01V 3/30; G01V 3/24
See application file for complete search history.

(56) References Cited

U.S. PATENT DOCUMENTS

| | | | |
|---|---|---|---|
| 7,183,778 B2 | 2/2007 | Homan et al. | |
| 8,525,533 B2* | 9/2013 | Sullivan | G01N 27/07 324/693 |
| 9,322,796 B2* | 4/2016 | Li | G01N 27/07 |
| 9,825,714 B1* | 11/2017 | Braylovskiy | H04B 15/005 |
| 2005/0030034 A1* | 2/2005 | Ganesan | E21B 49/10 324/324 |
| 2006/0255811 A1* | 11/2006 | Bittar | G01V 3/24 324/367 |

* cited by examiner

*Primary Examiner* — Christopher P McAndrew
*Assistant Examiner* — Zannatul Ferdous
(74) *Attorney, Agent, or Firm* — Eileen Pape (57) ABSTRACT

A method and apparatus are provided to measure fluid resistivity. The method includes driving a first winding at a first frequency to induce a first current in a fluid present in a flow line and then driving the first winding at a second frequency to induce a second current in the fluid present in the flow line. The method includes measuring the first and second currents and based on these results, determining a resistivity of the fluid. The apparatus includes an apparatus usable with a well that includes a flow line and a first winding to circumscribe the flow line. Also included is a transmitter to induce a number of currents in the flow line and a second winding to provide signals used to derive representations of excitation voltages and current magnitudes. The apparatus may further include an engine to determine a resistivity of the fluid in the flow line.

19 Claims, 6 Drawing Sheets

DOWNHOLE APPARATUS AND TECHNIQUE TO MEASURE FLUID RESISTIVITY

CROSS-REFERENCES TO RELATED APPLICATIONS

This application claims priority to U.S. Provisional Patent Application No. 62/434,586, filed on Dec. 15, 2016, which is incorporated in its entirety by reference herein.

BACKGROUND

Hydrocarbon fluids, such as oil and natural gas, are obtained from a subterranean geologic formation, referred to as a reservoir, by drilling a well that penetrates the hydrocarbon-bearing formation. During drilling and at other stages of exploration through production, various downhole tools may be used to acquire data for purpose of evaluating, analyzing, and monitoring the well bore and the surrounding geological strata. For example, one such tool may be a formation testing assembly, which may be deployed in the well for such purposes as analyzing formation fluid and collecting fluid samples.

SUMMARY

In accordance with an embodiment of the current disclosure, a method is provided that includes driving a first winding at a first frequency to induce a first current in a fluid present in a flow line. The method also includes driving the first winding at a second frequency other than the first frequency to induce a second current in the fluid present in the flow line. The method still further includes measuring the first and second currents and based at least in part on the results of measuring the first and second currents, determining a resistivity of the fluid.

In accordance with another embodiment of the current disclosure, a method is provided that includes inducing a plurality of currents at different times in a flow line of a downhole tool. Wherein the flow line includes a dielectric material and the flow line contains a fluid and a current path for the plurality of induced currents being routed through boundaries between the fluid and the dielectric material. And wherein inducing the plurality of currents includes varying a frequency of a signal applied to first winding of the downhole resistivity tool to produce a first induced current associated with a first frequency and a second induced current associated with a second frequency other than the first frequency.

The method further includes measuring the first induced current and the second induced current using at least one of the first winding or a second winding of the downhole resistivity tool and measuring a first excitation voltage associated with the first induced current and a second excitation voltage associated with the second induced current using at least one of the first winding or the second winding. In addition the method includes determining a resistivity of the fluid based at least in part on the measured first and second induced currents, the measured first and second measured excitation voltages, and the first and second frequencies.

In accordance with yet another embodiment of the current disclosure, an apparatus usable with a well is provided. The apparatus may include a flow line and a first winding to circumscribe the flow line. The apparatus may also include a transmitter to drive the first winding at a plurality of frequencies at different times to induce a plurality of currents in the flow line associated with the plurality of frequencies and a second winding to circumscribe the flow line to provide signals used to derive representations of excitation voltages and current magnitudes associated with the driving of the first winding by the transmitter. The apparatus may further include an engine to determine a resistivity of a fluid in the flow line based at least in part on the excitation voltages, the current magnitudes and the frequencies.

Advantages and other features will become apparent from the following description, drawings and claims.

DETAILED DESCRIPTION

Reference throughout the specification to "one implementation," "an implementation," "some implementations," "one aspect," "an aspect," or "some aspects" means that a particular feature, structure, method, or characteristic described in connection with the implementation or aspect is included in at least one implementation of the present disclosure. Thus, the appearance of the phrases "in one implementation" or "in an implementation" or "in some implementations" in various places throughout the specification are not necessarily all referring to the same implementation. Furthermore, the particular features, structures, methods, or characteristics may be combined in any suitable manner in one or more implementations. The words "including" and "having" shall have the same meaning as the word "comprising."

As used throughout the specification and claims, the term "downhole" refers to a subterranean environment, particularly in a well or wellbore. "Downhole tool" is used broadly to mean any tool used in a subterranean environment including, but not limited to, a logging tool, an imaging tool, an acoustic tool, a permanent monitoring tool, and a combination tool.

The various techniques, apparatuses and systems that are described herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures. Chemicals and chemical properties of interest in oilfield exploration and development may also be measured and stored by the sensing systems contemplated by the present disclosure. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed implementation. Thus, the claims following the Detailed Description are hereby expressly incorporated into this Detailed Description, with each claim standing on its own as a separate implementation.

Systems and techniques are described herein for purposes of determining the resistivity of a downhole formation fluid. In particular, as described herein, a fluid analyzer contains a fluid flow line that has a central passageway to receive a fluid, whose resistance is determined by the analyzer. The flow line includes a tubular electrically non-conductive, or dielectric, section that receives the fluid in a central passageway of the dielectric section, and spatially separated first and second windings surround, or circumscribe, the dielectric section. The fluid analyzer applies a time varying voltage to the first winding to induce a time changing magnetic field, which in turn, induces a current in the second winding and a voltage across the terminals of the second winding. The magnitude of the time changing magnetic field is a function of the resistance of the fluid in the dielectric section, and accordingly, the induced current and voltage of the second winding are functions of the resistance. Therefore, as described herein, by measuring the induced current and voltage, the fluid resistivity (the measured resistance divided by the length, or distance, over which the resistance is measured) may be determined.

The fluid in the flow line may be modeled as imparting a resistance, so that a measured excitation voltage across the fluid may be modeled as being a function of the resistance and a measured induced current. More specifically, one potential way to determine the fluid resistivity is model the relationship according to Ohm's law, such that a resistance for the fluid may be calculated as being the quotient of the measured excitation voltage divided by the measured induced current. As explained herein, however, such a technique for determining fluid resistivity may be relatively inaccurate, as the technique does not account for all reactance's in the path of the induced current. In this manner, the current path for the induced current not only includes the fluid flow path between the windings but also includes the two boundaries between the fluid and the surrounding flow tube wall. In accordance with example implementations that are described herein, the fluid resistivity is determined by taking into account the reactance's that are associated with these boundaries.

Figure 1:
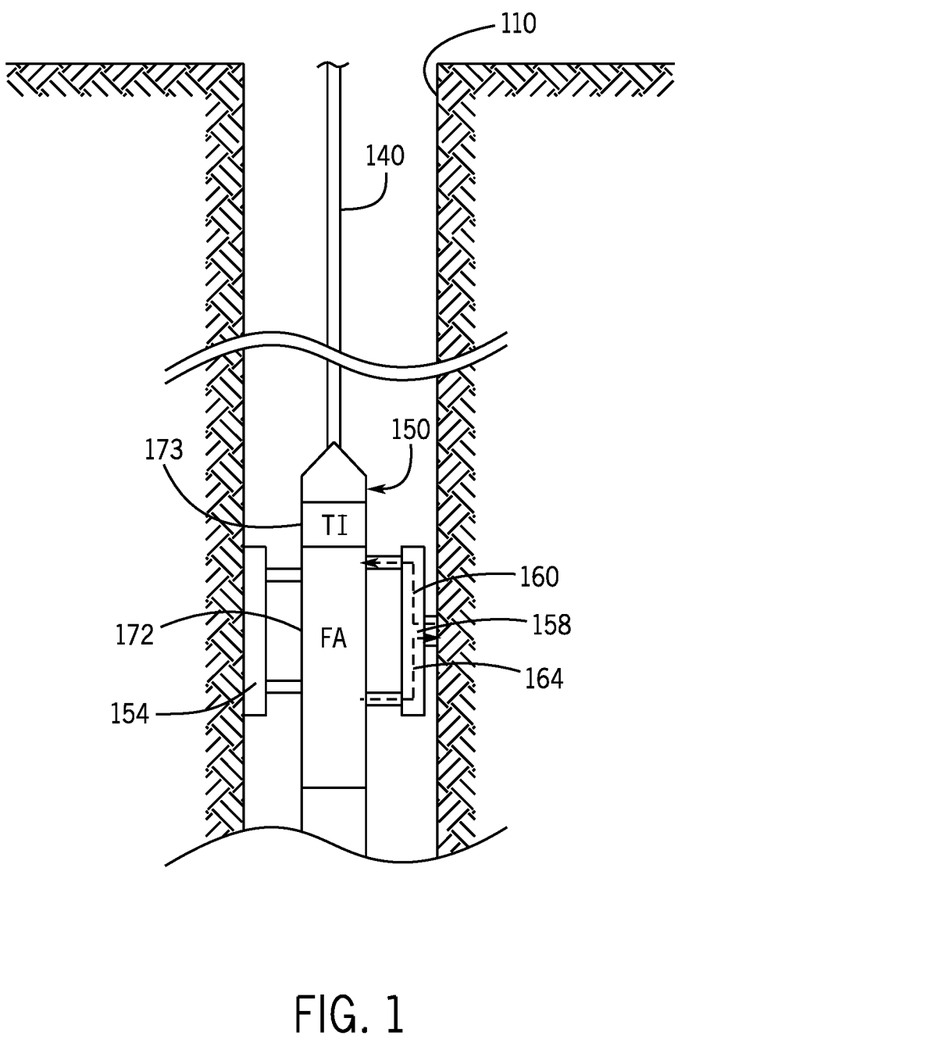
FIG. 1 is a schematic diagram of a downhole fluid testing assembly in a well according to an example implementation.

More specifically, referring to FIG. 1, in accordance with example implementations, a fluid testing assembly, such as example testing assembly 150, may be deployed downhole in a wellbore 110. In general, the wellbore 110 may be a vertically extending wellbore (as depicted in FIG. 1) or a horizontal, or laterally, extending wellbore, depending on the particular implementation.

For the example implementation depicted in FIG. 1, the fluid testing assembly 150 may be deployed downhole on a conveyance mechanism, such as a wireline 140. However, in accordance with further example implementations, the fluid testing assembly 150, may be deployed downhole on any of a number of different conveyance mechanisms, such as a slickline, a jointed tubing string and so forth. As a further example, in accordance with some implementations, the fluid testing assembly 150 may be deployed downhole on a drill pipe, or string, as part of a logging while drilling (LWD) system. Thus, many variations are contemplated, which are within the scope of the appended claims.

The fluid testing assembly 150 may be run downhole to a position at which fluid is to be monitored, analyzed and/or sampled. More specifically, in accordance with example implementations, the actions of the fluid testing assembly 150 may be remotely controlled (via commands sent through the wireline 140, for example, from the Earth surface) to laterally extend an anchoring member 154 of the assembly 150 so that the member 154 presses against the borehole wall to cause a fluid admitting assembly 158 on the diametrically opposed side of the assembly to be pressed against the borehole wall. In this manner, the fluid admitting assembly 158 may form a seal against the borehole wall for purposes of forming conducting fluid paths, as illustrated at references numerals 160 and 164 of FIG. 1. Fluid may then flow from the formation along intake paths 160 and into a fluid analyzer 172 of the fluid testing assembly 150.

The fluid analyzer 172 may determine various properties of the fluid, such as composition (fractions of methane, ethane, propane, pentane, and so forth, in the fluid), a gas-to-oil ratio, a fluid density, a fluid viscosity, a fluid resistivity, and so forth. The fluid analyzer 172 may also, in accordance with example implementations, collect a sample of the formation fluid in a sample chamber of the analyzer 172 so that the sampled fluid may be further analyzed after the fluid testing assembly 150 is withdrawn from the well.

For particular implementations that are described herein, the fluid analyzer 172 may at least determine the resistivity of the formation fluid. The determined resistivity may be communicated uphole (via the wireline 140, for example), in accordance with example implementations. The fluid resistivity may be determined for a number of reasons, such as, for example, for purposes of assessing the composition of the formation fluid.

The fluid resistivity may also be determined for purposes of assessing whether the fluid being analyzed by the fluid analyzer accurately represents the formation fluid or is contaminated. In this manner, when a well is being drilled, a drilling mud (more generally referred to as a drilling fluid) is introduced into the well as a lubricant to reduce the effects of friction between a drill bit of a drill string and a wall of the well. The drilling mud can also be used to keep the drill bit cool during use, as well as to maintain a hydrostatic pressure in the well. A drilling mud (or equivalently a drilling fluid) includes a liquid or a mixture of different liquids. In some cases, a drilling mud (or drilling fluid) can also contain a solid.

Contamination of formation fluid occurs when a mud filtrate of the drilling mud permeates into the formation surrounding the well during and after drilling. A mud filtrate of the drilling mud refers to the liquid component of the drilling mud. A formation fluid can refer to a fluid that is stored in a reservoir contained in the formation. Examples of formation fluids include hydrocarbons such as oil, gas, and/or other fluids.

After or during a well drilling process, formation fluid samples can be collected and analyzed to determine a formation fluid quality based on measuring relative amounts of different materials in the formation fluid samples. Due to the use of a drilling mud, formation fluid samples often contain a mixture of formation fluid and mud filtrate. The amount of mud filtrate in a formation fluid sample indicates the contamination level (i.e., the amount of contamination) of the formation fluid sample. If the mud filtrate is miscible with the formation fluid (e.g., such as when an oil-based drilling mud is used), the mud filtrate contamination in the formation fluid can reduce the quality of formation fluid samples and make subsequent analysis unreliable.

The mud filtrate contamination generally decreases as more fluid flows from the formation. Therefore, for purposes of obtaining more accurate results in the analysis of a fluid sample, one or multiple properties of the fluid, such as its resistivity, may be monitored so that the fluid is not fully analyzed and/or collected until the property(ies) represent that the contamination is below a specified threshold.

For example, the fluid resistivity may increase as the concentration of a water-based mud filtrate decreases. Therefore, by monitoring when the fluid resistivity stabilizes or increases above a specified resistivity threshold, a determination may be made whether the drilling mud contamination is sufficiently low.

Figure 2:
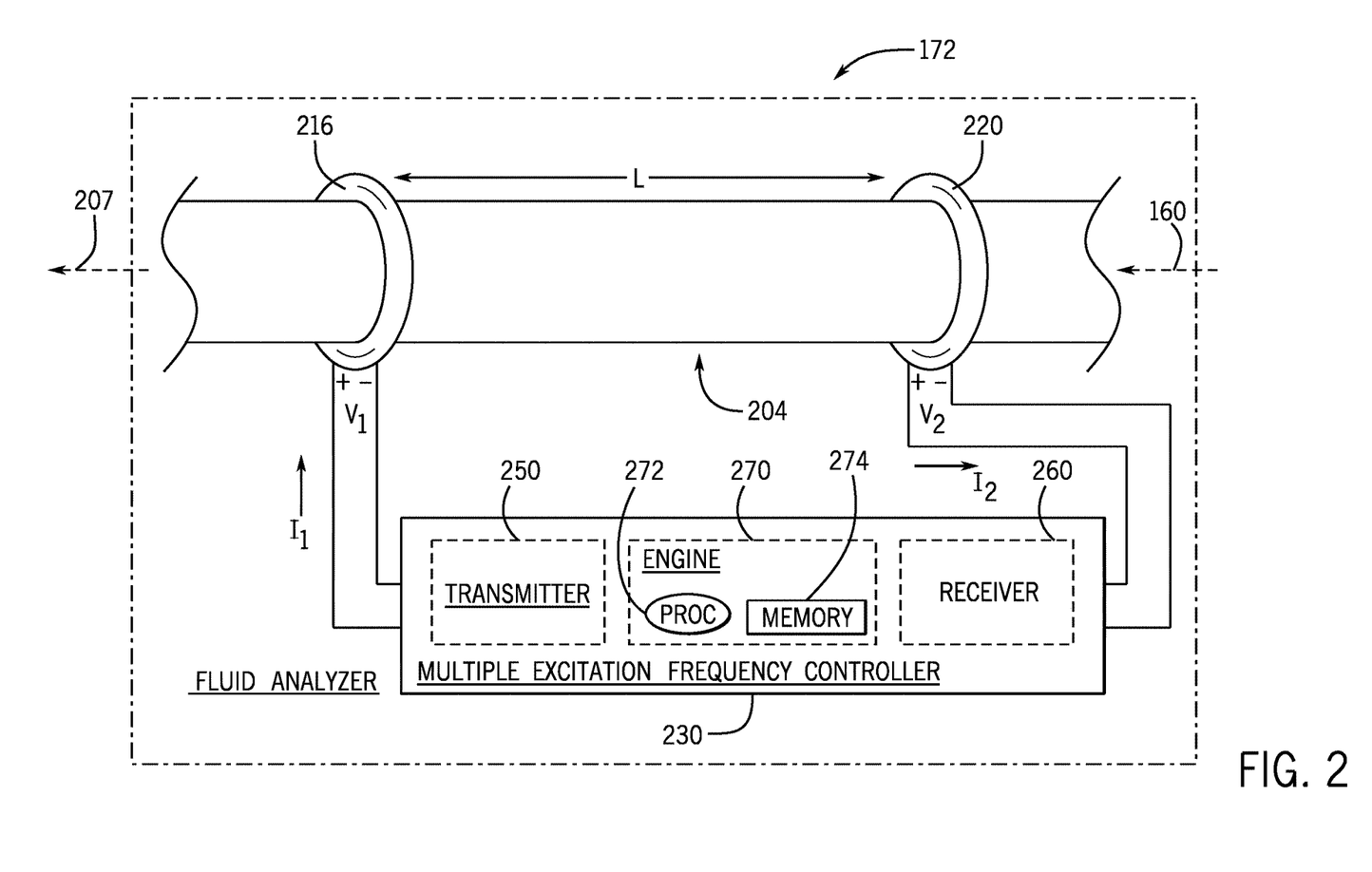
FIG. 2 is a schematic view of a fluid analyzer of the fluid testing assembly of FIG. 1 according to an example implementation.

FIG. 2 depicts a schematic representation of the fluid analyzer 172, in accordance with example implementations. In general, the fluid analyzer 172 may include a flow path that includes an electrically non-conductive, or dielectric, section, called a "flow tube 204" herein. As examples, the flow tube 204 may be formed a dielectric material, such as a ceramic material, a glass material, a PEEK material, and so forth, depending on the particular implementation.

In accordance with example implementations, the flow tube 204 may be a cylindrical tubing (as depicted in FIG. 2), which has a central passageway that forms part of the flow path for the fluid received from the fluid admitting assembly 158. As depicted in FIG. 2, the flow tube 204 may receive the fluid from flow path 160 and provide an exit flow 207, which may be sampled and stored in a sample chamber (not shown) of the fluid testing assembly 150 or routed back to another flow path (such as flow path 164, for example).

In accordance with example implementations, the fluid analyzer 172 contains a first winding 216 and a second winding 220, which are spaced apart along the longitudinal axis of the flow tube 204. Each winding 216, 220 circumscribes, or surrounds, the flow tube 204. In accordance with example implementations, the windings 216 and 220 may be part of respective toroids. In this manner, a given toroid may include the winding (i.e., multiple loops, or turns, of an electrical conductor, or wire), which extend about a donut-shaped ferromagnetic core, and the ferromagnetic core circumscribes, or surrounds, the flow tube 204.

For purposes of determining the resistivity of the fluid in the flow tube 204, in accordance with example implementations, a multiple excitation frequency controller 230 of the fluid analyzer 172 applies a time varying voltage (called the "$V_1$ voltage" herein) across the terminals of the first winding 216. The applied time varying $V_1$ voltage, in turn, produces a time varying magnetic field, which, in turn, induces a time varying voltage (called the "$V_2$ voltage" herein) across the terminals of the second winding 220 and induces a time varying current (called the "$I_2$ current" herein) in the second winding 220. More specifically, referring to FIG. 3 in conjunction with FIG. 2, the first 216 and second 220 windings are inductively coupled (as depicted by example flux lines 310), and the magnetic field is associated with an induced current in the fluid in the flow tube 204. As such, the resistivity of the fluid in the flow tube 204 affects, or influences, the magnitudes of the $V_2$ voltage and $I_2$ current. Therefore, by measuring the $V_2$ voltage and $I_2$ current and applying the appropriate calculations (described herein), the multiple excitation frequency controller 230 may determine the fluid resistivity.

Figure 3:
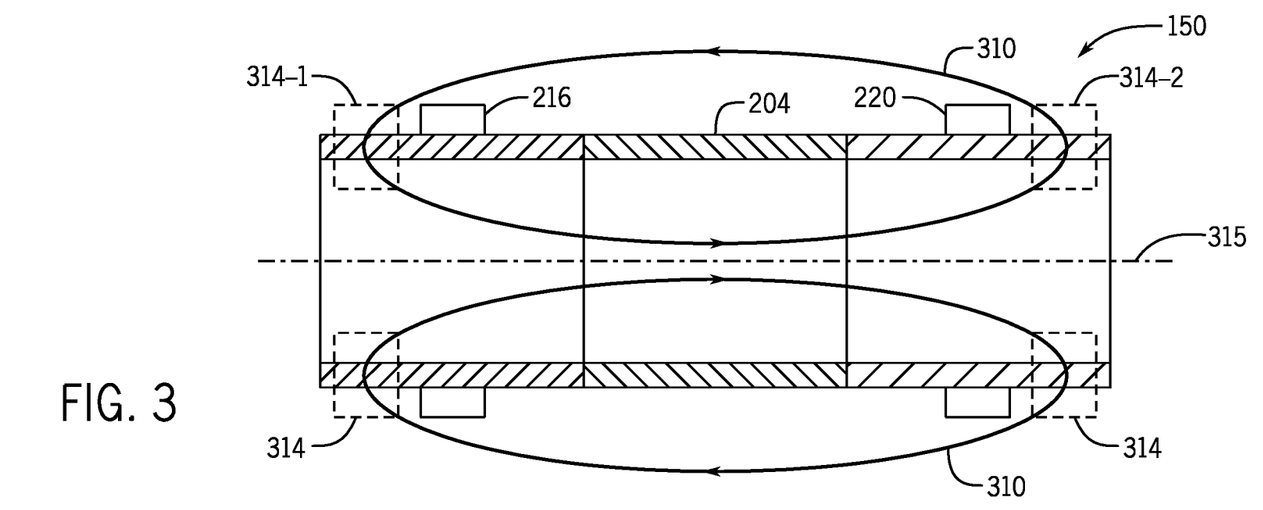
FIG. 3 is a cross-sectional view of a flow line of the fluid analyzer of FIG. 2 illustrating a magnetic flux field generated by the fluid analyzer according to an example implementation.

As illustrated at reference numerals 314-1 and 314-2 of FIG. 3, the magnetic field passes through two double layer boundaries. Each boundary is created between the fluid inside the flow pipe 204 and the wall of the flow tube 204. Moreover, each boundary is associated with a reactance: a resistance in series with and a capacitance. The induced current in the fluid in the flow tube 204 is a function of the resistance of the fluid and the double layer reactance's.

Figure 4:
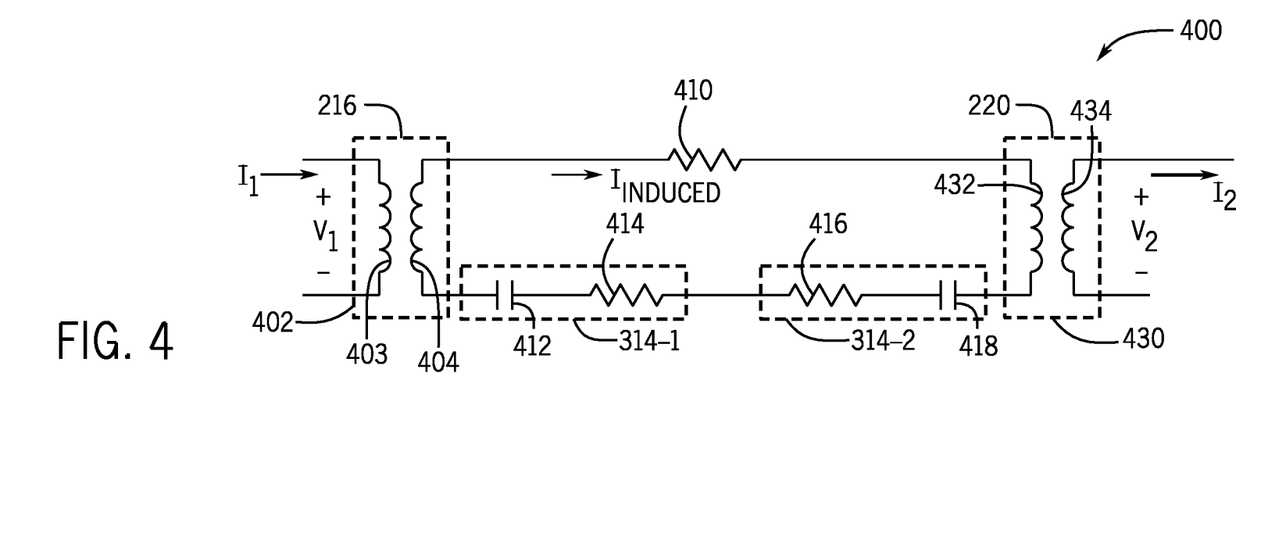
FIG. 4 is an electrical schematic diagram illustrating measurement of a fluid resistivity by the fluid analyzer according to an example implementation.

More specifically, FIG. 4 is an electrical schematic diagram 400 illustrating the electrical coupling of the first 216 and second 220 windings, in accordance with example implementations. As depicted in FIG. 4, the first winding 216 may be viewed as being a transformer 402, which has a primary winding 403 that receives the $V_1$ voltage. The time varying $V_1$ voltage produces a current (called "$I_{INDUCED}$") in a secondary winding 404 of the transformer 402. Referring to FIG. 3 in conjunction with FIG. 2, the magnitude of the $I_{INDUCED}$ current is a function of the following reactance's: a resistance 410, which corresponds to the resistivity of the fluid; a resistance 414 and a capacitance 412 associated with the boundary 314-1; and a resistance 416 and a capacitance 418 associated with the boundary 314-2.

The second winding 220, as illustrated in FIG. 4, may be viewed as a transformer 430 having a primary winding 432 that receives the $I_{INDUCED}$ current (i.e., is serially coupled to the secondary winding 404 and is in series with the above-described reactance's). A secondary winding 430 of the transformer 220 provides the $V_2$ voltage and provides the $I_2$ current.

Because capacitances 412 and 418 may not be directly measured, in accordance with example implementations, the multiple excitation frequency controller 230 (FIG. 2) controls the $V_1$ voltage in a manner that allows the influence of the capacitances to be removed. More specifically, in accordance with example implementations, the multiple excitation frequency controller 230 drives the first winding 216 with $V_1$ voltages that have different frequencies. For each of these frequencies, the multiple excitation frequency controller 230 measures the $V_2$ and $I_2$ currents (via a sensor, or receiver 260); and based on the results of these measurements, an engine 270 of the multiple excitation frequency controller 230 determines the fluid resistivity.

More specifically, in accordance with some implementations, the multiple excitation frequency controller 230 may apply two sinusoidal voltages having two different frequencies to the terminals of the first winding 216 at different times for purposes of acquiring two sets of measurements. In this manner, the multiple excitation frequency controller 230 may apply a sinusoidal $V_1$ voltage having a frequency $f_1$ to the terminals of the first winding 210. The controller 230 may then determine the resulting $I_{INDUCED}$ current and an excitation voltage (called "$V_{EXCITATION}$" herein) across the impedances associated with the $I_{INDUCED}$ current based on the applied $V_1$ voltage, the measured $V_2$ voltage, the measured $I_2$ current, and the mutual and self-inductances of the windings 210 and 216. Next, the controller 230 may apply a sinusoidal $V_1$ voltage having a different frequency $f_2$ to the terminals of the first winding 210; and the controller 230 may then determine the resulting $I_{INDUCED}$ current and the $V_{EXCITATION}$ voltage based on the applied $V_1$ voltage, the measured $V_2$ voltage, the measured $I_2$ current, and the mutual and self-inductances of the windings 210 and 216.

The relationship between the $V_{EXCITATION}$ voltage and the $I_{INDUCED}$ current when the $V_1$ voltage has the frequency $f_1$ may be described as follows:

$$V_{EXCITATION@f_1} = \left(R_f + R + \frac{1}{s_1 c}\right) I_{INDUCED@f_1}, \quad \text{Eq. 1}$$

where "$R_f$" represents the resistance of the fluid in the flow tube 204; "c" represents the combined capacitances of the two double layers; "R" represents the combined resistances of the two double layers; and "$s_1$" represents "$i \cdot 2\pi f_1$," where "i" is an imaginary number. The relationship between the $V_{EXCITATION}$ voltage and the $I_{INDUCED}$ current when the $V_1$ voltage has the frequency $f_2$ may be described as follows:

$$V_{EXCITATION@f_2} = \left(R_f + R + \frac{1}{s_2 c}\right) I_{INDUCED@f_2}. \quad \text{Eq. 2}$$

Eqs. 1 and 2 may be combined to determine the fluid resistance $R_f$, as described below:

$$R_f = \left(f_1 \frac{V_{EXCITATION@f_1}}{I_{INDUCED@f_1}} - f_2 \frac{V_{EXCITATION@f_2}}{I_{INDUCED@f_2}}\right) / (f_1 - f_2) - R. \quad \text{Eq. 3}$$

In some cases, $R_f \gg R$, and the fluid resistance $R_f$ may be accurately estimated as follows:

$$R_f = \left(f_1 \frac{V_{EXCITATION@f_1}}{I_{INDUCED@f_1}} - f_2 \frac{V_{EXCITATION@f_2}}{I_{INDUCED@f_2}}\right) / (f_1 - f_2). \quad \text{Eq. 4}$$

Figure 5A:
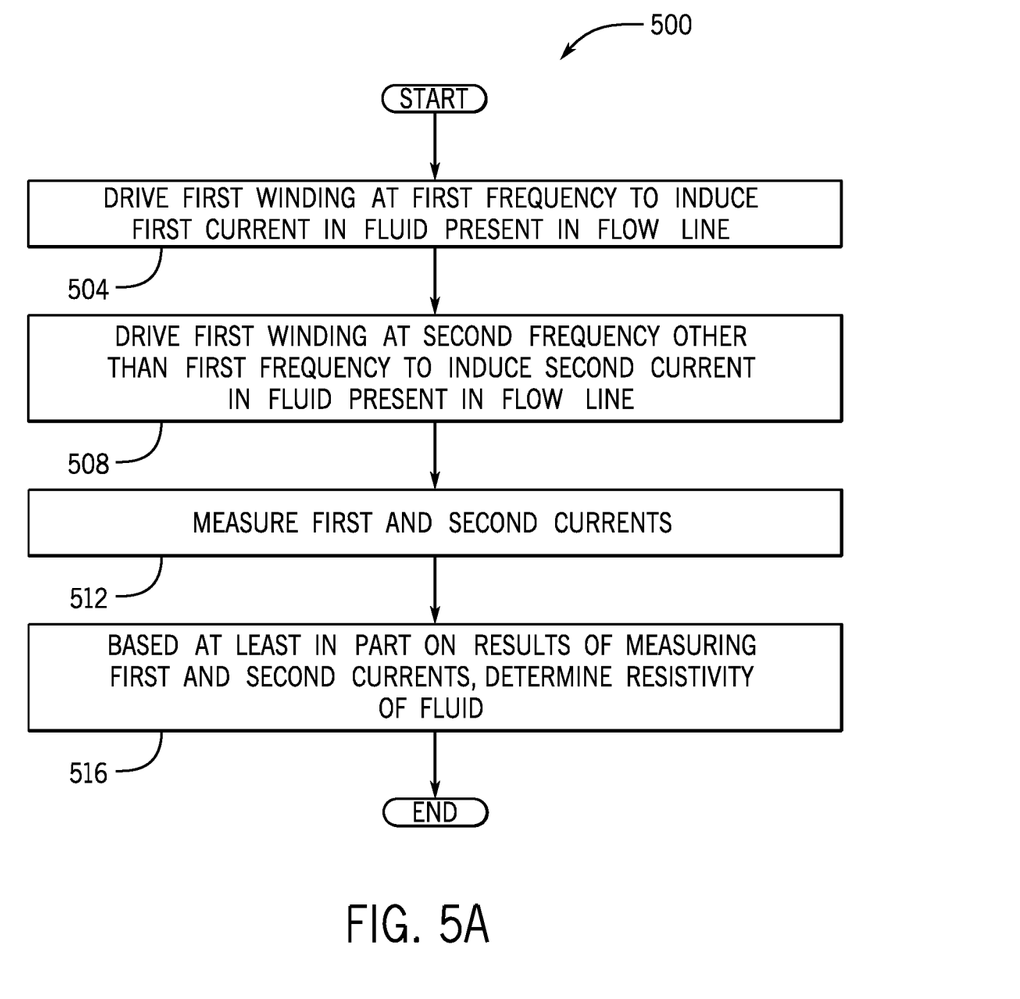
FIGS. 5A and 5B are flow diagrams illustrating techniques to determine a fluid resistivity according to example implementations.

Thus, referring to FIG. 5A, in accordance with example implementations, a technique 500 includes driving (block 504) a first winding at a first frequency to induce a first current in fluid that is present in a flow line. The technique 500 includes driving (block 508) the first winding at a second frequency other than the first frequency to induce a second current in the fluid that is present in the flow line. The technique 500 includes measuring (block 512) the first and second currents and based at least in part on the result of measuring the first and second currents, determining (block 516) a resistivity of the fluid.

Figure 5B:
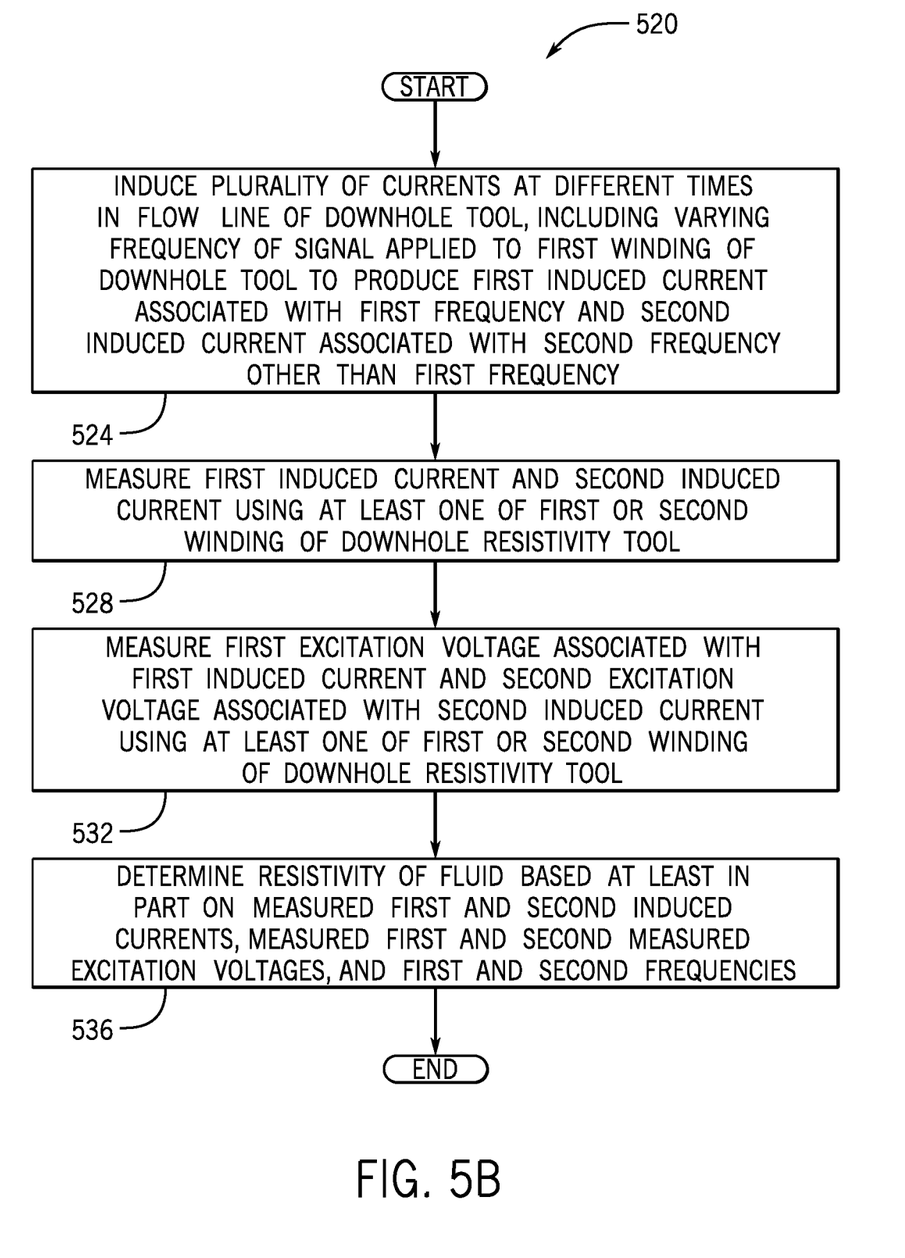

More specifically, referring to FIG. 5B, in accordance with example implementations, a technique 520 for determining the resistivity of a fluid includes inducing (block 524) a plurality of currents at different times in a flow line of a downhole tool. Inducing the currents includes varying the frequency of a signal that is applied to a first winding of the downhole tool to produce a first induced current that is associated with a first frequency and a second induced current that is associated with a second frequency other than the first frequency. The technique 520 includes measuring (block 528) the first induced current and the second induced current using at least one of the first or second winding of the downhole tool. The technique includes measuring (block 532) a first excitation voltage that is associated with the first induced current and a second excitation voltage that is associated with the second induced current using at least one of the first winding or the second winding of the downhole tool. The technique 520 includes determining the resistivity of the fluid based at least in part on the measured first and second induced currents, the measured first and second excitation voltages and the first and second frequencies, pursuant to block 536.

Referring back to FIG. 2, in accordance with example implementations, the multiple excitation frequency controller 230 may include a processor-based engine 270 for purposes of driving the first winding 216 as described herein, measuring currents and voltages as described herein and determining a fluid resistivity, as described herein. More specifically, in accordance with some implementations, the engine 270 may contain one or multiple processors 272 (one or multiple central processing units (CPUs, for example, one or multiple CPU processing cores, and so forth). In this manner, the processor(s) 272 may execute machine executable instructions that are stored in a memory 272 of the engine 270 to perform one or more parts of the techniques 500 and/or 520. In this manner, the instructions that are stored in the memory 274, when executed by the processor(s) 272 may cause the processor(s) 272 to operate one or multiple transmitters 250 of the multiple excitation frequency controller 230 for purposes of driving the first winding 210.

For example, in accordance with some implementations, the processor(s) 272 may execute instructions that are stored in the memory 274 for purposes of enabling a transmitter 250 to drive the first winding 216 at a first frequency; and in response to the first winding 216 being driven at the first frequency, the processor(s) 272 may execute instructions stored in the memory 274 for purposes of causing the processor(s) 272 to read values that are sensed by one or multiple receivers 260 (operational amplifier circuits, for example) of the multiple excitation frequency controller 230. For example, in accordance with some implementations, the controller 230 may include a first sensor, or receiver 260, to sense the $V_2$ voltage, as stated above, a second sensor, or receiver 260, to sense the $I_2$ current, and so forth. The processor(s) 272 may then execute instructions stored in the memory 274 for purposes of, for example, changing the operating frequency of the transmitter 250 or selecting another transmitter associated with a different second frequency for purposes of driving the first winding 216 at this other frequency. The processor(s) 272 may then, through execution of instructions stored in the memory 274, read values for the $V_2$ voltage and $I_2$ current. From this information, the processor(s) 272 may then execute instructions stored in the memory 274 for purposes of determining the resistivity of the fluid, as described herein.

In accordance with some implementations, the memory 274 may be a non-transitory storage medium, such as a storage medium formed from semiconductor storage devices, optical storage devices, magnetic storage devices, phase change memory devices, memristors, one or more of these memory technologies, and so forth, depending on the particular implementation.

In accordance with further example implementations, the engine 270 may be formed from one or multiple hardwired circuits, instead of processor-based circuitry. In this manner, in accordance with some implementations, the engine 270 may be formed from one or multiple application specific integrated circuits (ASICs). Thus, many implementations are contemplated, which are within the scope of the appended claims.

Figure 6:
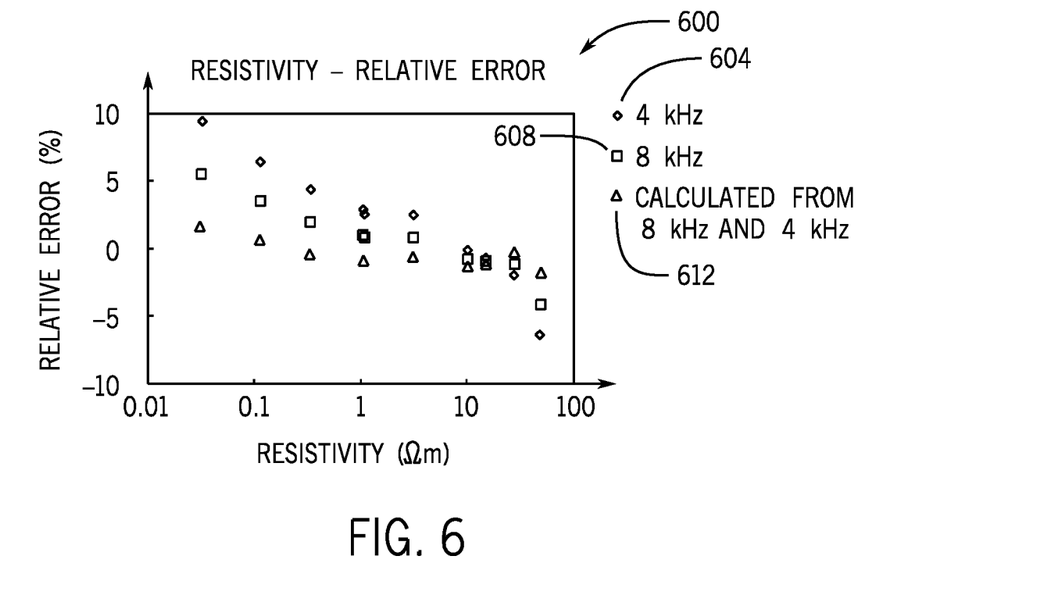
FIG. 6 is a plot of a relative fluid resistivity error without taking into account the resistance of a boundary between fluid in the flow tube and the flow tube wall according to an example implementation.

FIG. 6 is an illustration 600 of relative errors associated with resistivities determined as described herein. For FIG. 6, the fluid resistivity was determined without taking into account the resistivity of the double layer boundaries. In particular, FIG. 6 depicts a plot (associated with key 604) of a relative error in the resistivity derived from the calculation of the fluid resistivity based on a 4 kiloHertz (kHz) frequency driving the first winding 260. FIG. 6 also depicts a relative error (represented by key 608) from determining the resistivity of the fluid by driving the first winding 216 using an 8 kHz signal. As can be seen from a relative error (represented by key 612) of a fluid resistivity derived from multiple frequency-based measurements (such as a fluid resistivity derived using the technique 500 or 520 described herein, for example), the fluid resistivity determined from the dual frequencies is relatively more accurate, and thus, associated with less relative error.

Figure 7:
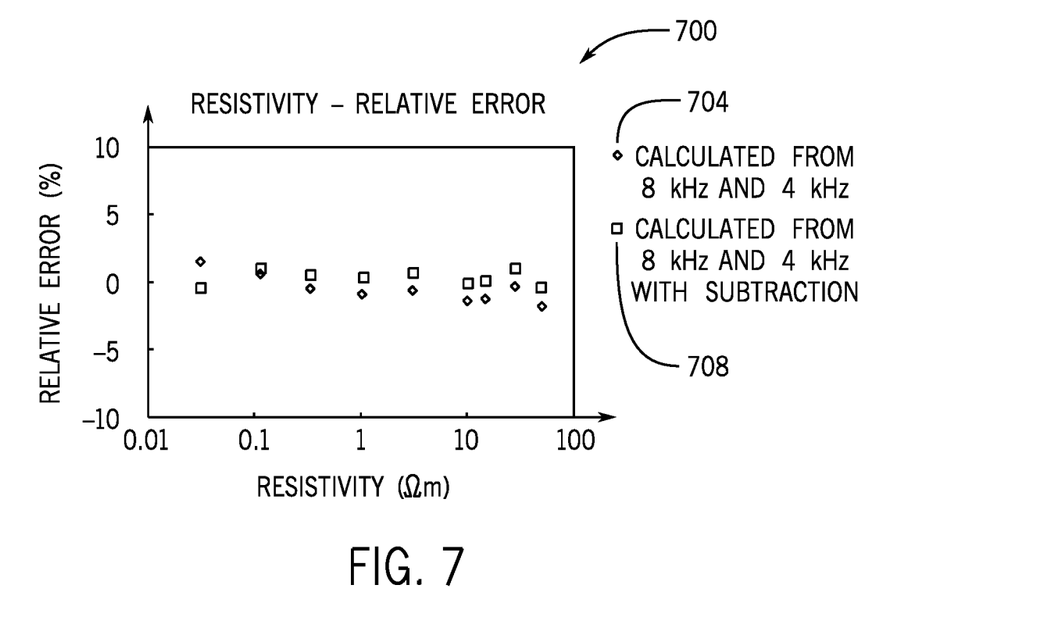
FIG. 7 is a plot of a relative resistivity error taking into account the resistance of the boundary between fluid in the flow tube and the flow tube wall according to an example implementation.

FIG. 7 is an illustration 700 of a relative error of a fluid resistivity determined from the dual frequency measurements, as described herein, while taking into account the resistance of the double layer boundary. As depicted by the points associated with key 708, the relative error is significantly less when measurements from the combined frequencies are used and when the resistance of the electrically conductive material of the flow pipe is considered.

In accordance with some implementations, multiple excitation frequency controller 230 may be programmed to calibrate the controller 230 with an offset that corresponds to the resistance R. In this regard, this calibration may be done, for example, under laboratory or controlled conditions where the fluid resistivity is known. Therefore, by determining the offset to apply to the measured fluid resistivity, the fluid analyzer may be calibrated so that the resistance R may be subtracted from the value determined using Eq. 4.

Although only a few example implementations have been described in detail above, those skilled in the art will readily appreciate that many modifications are possible in the example implementations without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method comprising:
   driving a first winding at a first frequency to induce a first current in a fluid present in a flow line;
   driving the first winding at a second frequency other than the first frequency to induce a second current in the fluid present in the flow line;
   measuring the first and second currents; and
   based at least in part on results of measuring the first and second currents, determining a resistivity of the fluid;
   wherein the flow line comprises a dielectric section;
   wherein a current path for the induced currents is routed between boundaries, where each boundary is between the fluid in the flow line and the dielectric section of the flow line.

2. The method of claim 1, further comprising determining the resistivity based on at least in part on the first frequency and the second frequency.

3. The method of claim 1, wherein measuring the first and second currents comprises using a second winding that is electromagnetically coupled to the first winding.

4. The method of claim 1, wherein the determining the resistivity comprises using the first and second frequencies to eliminate a capacitance associated with the boundaries.

5. The method of claim 1, wherein determining the resistivity further comprises determining the resistivity based at least in part on a resistance associated with the boundaries.

6. The method of claim 5, wherein determining the resistivity based at least in part on the resistance associated with the boundaries comprises calibrating a measurement tool to offset a resistivity value determined by the tool by the resistance.

7. The method of claim 1, wherein determining the resistivity of the fluid comprises:
   determining a first ratio of an excitation voltage associated with driving the first winding at the first frequency to the first current;
   determining a second ratio of an excitation voltage associated with driving the first winding at the second frequency to the second current;
   determining a first product of the first ratio and the first frequency;
   determining a second product of the second ratio and the second frequency;
   determining a first difference of the second product less the first product;
   determining a second difference of the second frequency less the first frequency; and
   determining a quotient of the first difference divided by the second difference.

8. The method of claim 7, wherein:
   determining the resistivity further comprise determining a difference of the quotient less a resistance associated with the boundaries.

9. A method comprising:
   inducing a plurality of currents at different times in a flow line of a downhole tool, wherein:
      the flow line comprises a dielectric material and the flow line contains a fluid;
      a current path for the plurality of induced currents is routed through boundaries, where each boundary is between the fluid in the flow line and the dielectric material of the flow line; and
      inducing the plurality of currents comprises varying a frequency of a signal applied to a first winding of the downhole resistivity tool to produce a first induced current associated with a first frequency and a second induced current associated with a second frequency other than the first frequency;
   measuring the first induced current and the second induced current using at least one of the first winding or a second winding of the downhole resistivity tool;
   measuring a first excitation voltage associated with the first induced current and a second excitation voltage associated with the second induced current using at least one of the first winding or the second winding; and determining a resistivity of the fluid based at least in part on the measured first and second induced currents, the measured first and second measured excitation voltages, and the first and second frequencies.

10. The method of claim 9, further comprising calibrating the downhole resistivity tool for an offset correction corresponding to a resistance associated with the boundaries.

11. An apparatus usable with a well, comprising:
a flow line having a dielectric section;
a first winding to circumscribe the flow line;
a transmitter to drive the first winding at a plurality of frequencies at different times to induce a plurality of currents in the flow line associated with the plurality of frequencies;
a second winding to circumscribe the flow line to provide signals used to derive representations of excitation voltages and current magnitudes associated with the driving of the first winding by the transmitter;
an engine to determine a resistivity of a fluid in the flow line based at least in part on the excitation voltages, the current magnitudes and the frequencies; and
a current path for the induced currents routed between boundaries, where each boundary is between the fluid in the flow line and the dielectric section of the flow line.

12. The apparatus of claim 11, wherein the dielectric section comprises:
a dielectric tubular member containing the fluid therein.

13. The apparatus of claim 12, wherein:
the current path associated with the plurality of currents extends along an axis of the dielectric tubular member.

14. The apparatus of claim 13, wherein the current path is associated with boundaries between the fluid and the dielectric tubular member.

15. The apparatus of claim 14, wherein the engine determines the resistivity based at least in part on a resistivity associated with the boundaries.

16. The apparatus of claim 11, wherein the engine is adapted to be programmed with an offset value to account for the resistivity associated with the boundaries.

17. The apparatus of claim 11, further comprising a first toroid associated with the first winding and a second toroid associated with the second winding.

18. The apparatus of claim 11, further comprising a fluid admitting assembly to provide the fluid to the flow line and comprising an anchor to be actuated to press the fluid admitting assembly against a borehole wall.

19. The apparatus of claim 11, wherein the plurality of currents comprise a first current and a second current, the plurality of frequencies comprises a first frequency associated with the first current and a second frequency greater than the first frequency and associated with the second current, and the engine is adapted to:
determine a first ratio of an excitation magnitude produced by the transmitter driving the first winding at the first frequency to the first current;
determine a second ratio of an excitation magnitude produced by the transmitter driving the first winding at the second frequency to the second current;
determine a first product of the first ratio and the first frequency;
determine a second product of the second ratio and the second frequency;
determine a first difference of the second product less the first product;
determine a second difference of the second frequency less the first frequency; and
determine the resistivity of the fluid based at least in part on a quotient produced by dividing the first difference by the second difference.

* * * * *